United States Patent Office 2,926,992
Patented Mar. 1, 1960

2,926,992

PROCESS FOR RECOVERY OF URANIUM VALUES

Ronald Edwin Stedman, Norton-on-Tees, England, assignor to Imperial Chemical Industries Limited, London, England, a corporation of Great Britain No Drawing. Application January 27, 1955
Serial No. 484,559

Claims priority, application Great Britain
February 1, 1954

16 Claims. (Cl. 23—14.5)

This invention relates to the recovery of mineral values from rock phosphate and is particularly concerned with the recovery of the uranium values contained therein.

Natural rock phosphate from many sources, for example, Florida and North Africa, contains traces of uranium in combination, and these traces may amount by weight to one hundred parts per million or more, when expressed as the oxide $U_3O_8$. Rock phosphate is used extensively as a raw material in the chemical industry for the recovery of its phosphoric acid content which ultimately appears in commerce, for example as the free acid, as fertilizers, and as detergents. In the various processes used for the chemical opening up of rock phosphate and for the preparation therefrom of various useful materials, for example, of the type above-indicated, reaction mixtures are obtained, which are particularly suitable for treatment to recover their uranium values.

It is an object of the present invention to recover uranium values from reaction mixtures obtained by opening up rock phosphate with a reactant comprising a mineral acid.

According to the present invention therefore, there is provided a process for the recovery of uranium values from rock phosphate which comprises the steps of opening up a rock phosphate with a reactant comprising a mineral acid, neutralising the reaction mixture, precipitating from the liquid obtained therefrom a uranium salt in the presence of a filter aid, using a reducing agent as a precipitant, separating the solid mixture from the liquid, treating with a mineral acid the separated solid to dissolve the precipitated uranium salt from the filter aid, separating the solution produced and treating it for the precipitation of uranium values in concentrated form, as hereinafter described.

In general, the initial opening up of the rock phosphate will be dictated by the final phosphate-containing material which it is desired to produce. Thus the rock phosphate may be opened up with sulphuric acid as a step in the production of phosphoric acid to be used in the manufacture of, for example, fertilizers or detergents, or it may be opened up with hydrochloric acid or nitric acid or with mixtures of mineral acids such as of sulphuric acid with nitric acid or it may be opened up by treatment with a liquid mixture comprising sulphuric acid containing ammonium sulphate as a step in the production of monammonium phosphate. If desired, after the opening up process, any residual solid remaining or solid produced in the reactions occurring during the opening up process, such as calcium sulphate, may be removed, for example, by filtration, centrifuging or a simple decantation process. It is desirable to open up the rock phosphate under oxidising conditions: these are already provided when nitric acid is used, but when for example, sulphuric acid is a constituent of the reagent used for this step then it is convenient to pass a stream of air through the reaction mixture.

The reaction mixture produced by opening up the rock phosphate, either with or without removal of the solids present is then neutralised with a suitable reactant. By "neutralisation," as used in this specification, is to be understood neutralisation to that stage at which the acidity is decreased to a value at which the reducing agent used in a subsequent step of the process is effective. In general the reducing agents to be used tend to be decomposed in strongly acid solution, and are therefore ineffective. With solutions of the type described in the example hereinafter given, the action of the reducing agent was inadequate when the pH value of the reactant mixture was increased only to 2.0. Neutralisation to pH values in the range 3.5 to 5.0 have been found satisfactory. Suitable reagents are gaseous ammonia, the hydroxides and carbonates of ammonia, the alkali and alkaline earth metals. If residual solid or solid produced during the opening up process has not previously been removed, or if such solid has been removed and further solid is produced during the neutralisation, it is now removed, for example by filtration, decantation, or centrifuging. The liquid obtained after this neutralisation and separation step is hereinafter referred to as the conditioned liquid.

A suitable quantity of a filter aid such as kieselguhr, silica, fuller's earth, or diatomaceous earth is now added to the conditioned liquid. The quantity of filter-aid added may vary within wide limits. The quantity of filter aid used should be as small as possible compatible with satisfactory collection of the subsequently precipitated uranium compound. It will be understood that quantities much in excess of this would be an unnecessary load on the subsequent filtration step. We have found it convenient to add between 0.5 gm. to 1.0 gm. per litre of conditioned liquid. Thereafter the uranium values are precipitated from the conditioned liquid by treatment with a reducing agent. A suitable reducing agent is sodium hydrosulphite ($Na_2S_2O_4$), which conveniently is added in the proportion of 0.5 to 1.0 gm. per litre of liquid to be treated. The reduction step should not be carried out at too high a temperature. In particular, temperatures at which the reducing agent being used is liable to decomposition under the reaction conditions should be avoided. Moderately elevated temperatures, for example in the neighbourhood of 50° C. are satisfactory.

The solid is then filtered off and if desired, washed. The liquid obtained may then be worked up to produce for example, fertilizers or detergents. Instead of filtering the whole of the slurry obtained in the precipitation step, it may be passed to a settling tank from which a part of the thickened slurry may be returned to a preceding step in the process, for example, to the step preceding precipitation, while the remainder may be passed to the filtration step. The solid obtained by filtration is treated with a mineral acid, preferably under oxidising conditions to dissolve the precipitated uranium values. Oxidising conditions may be provided by the presence of sulphuric acid and manganese dioxide but it is preferable, however, to use nitric acid for this step of the process. The quantity of nitric acid used is preferably in excess of the stoichiometric proportion. The liquid is now separated from the solid filter aid which if desired may be returned to the process.

The liquid thus obtained is now treated for the recovery of uranium values in concentrated form by one of the processes to be described in the following paragraphs.

In the first process, the liquid obtained by treating the solid containing filter aid and uranium values, is treated with an oxidising agent to precipitate hydrated uranium tetroxide. A suitable oxidising agent is hydrogen peroxide. It has been found that stirring the reaction mixture for a considerable time, say 10 to 15 hours assists in obtaining efficient precipitation. As an alternative to prolonged stirring, the hydrogen peroxide may be added in two or more batches, stirring between each addition. The precipitate of hydrated uranium tetroxide may now be filtered off and dried, whereby there is obtained a yellow solid containing the hydrated oxide. In operating this method of precipitating the uranium concentrate, it is desirable to wash the precipitate comprising the filter aid and the uranium values to remove as much as possible of other phosphates which may be present in the solid, the presence of which tends to hinder the ultimate precipitation of the uranium concentrate. The filtrate from this process may be returned to the process for example to the crude phosphate liquor, before it is treated according to the present invention. It is sometimes desirable before carrying out the precipitation step, to dilute the clear liquid and to increase its pH value for example to one of about 0.5. Dilution of the clear liquid with water may be sufficient to cause a satisfactory increase in the pH value, but if desired the increase may be assisted by the addition of alkali, which preferably is aqueous ammonia. Here again, the ultimate precipitation of the uranium values is more effective when the acidity of the reactant liquid is decreased before precipitation.

As an alternative to the above-described process for the precipitation of the uranium concentrate, the clear liquid is treated to adjust its pH to a value of about 1.0 or more, whereby there is obtained a solid containing a high proportion of uranium, which we believe is a complex uranium phosphate. We have found that satisfactory precipitation is obtained if the pH value of the liquid obtained by treating the solid containing filter aid and uranium values, is adjusted with ammonia to a value of about 1.0. After adjusting the pH value with ammonia it is preferable to stir the reaction mixture for a time, for example about two hours. It is believed that the precipitate thus obtained is uranyl ammonium phosphate ($NH_4.UO_2.PO_4$). By drying and igniting the precipitate, the concentration of uranium (expressed as $U_3O_8$), is increased considerably.

*Example*

A Moroccan rock phosphate containing about one hundred parts per million of uranium, expressed as $U_3O_8$ was treated with a mixture of sulphuric acid and ammonium sulphate at 80° C. while passing a stream of air through the mixture, the proportion by weight of the various reactants being as follows: 264 rock phosphate, 256 of 77% sulphuric acid, 40 of ammonium sulphate and 70 of water. After reaction the precipitated calcium sulphate was filtered off, sodium silicofluoride removed from the liquid by conventional treatment and the pH value of the liquor was adjusted to about 4.0 by means of ammonia gas. The liquor was then filtered to remove sludge. This is conditioned liquid. To eight litre portions of conditioned liquid, there were then added 8.0 grams of kieselguhr and 8.0 grams of sodium hydrosulphite. The mixture was warmed to 60° C., and stirred for half an hour, and was then filtered, the solid material being retained for further treatment. Two 6.0 gram portions of solid thus obtained were each treated with 6.0 mls. of concentrated nitric acid and 12 mls. of water, and warmed, after which the mixture was filtered, the solid being suitable for return to the process for re-use as a filter aid. The two separate solutions obtained were then treated as follows.

*Portion A.*—This was treated with 15.0 mls. of hydrogen peroxide (100 volume strength) and the mixture stirred overnight, while maintained at room temperature. The mixture was then filtered to give a yellow solid which after drying at 100° C., weighed 0.317 gram and was substantially hydrated uranium tetroxide ($UO_4.2H_2O$), containing 76% by weight of uranium expressed as $U_3O_8$.

*Portion B.*—The pH value of the liquid was adjusted to about 1.0 by the addition of ammonium hydroxide and the mixture stirred for two hours, whereby a yellow precipitate was obtained. This was filtered off, washed and dried at 100° C., whereby there was obtained 0.5 gram of a substance believed to be uranyl ammonium phosphate ($NH_4UO_2PO_4$), and which contained 57% of uranium expressed as $U_3O_8$.

I claim:

1. A process for the recovery of uranium values from rock phosphate which comprises the steps of opening up rock phosphate with a reactant consisting essentially of a mineral acid, neutralising the resulting reaction mixture to a pH value in the range of 3.5 to 5.0, separating undissolved materials, and precipitating from the liquid obtained therefrom, a phosphate-containing uranium salt in the presence of an added inorganic filter aid using as precipitant a reducing agent, separating the solid mixture from the liquid, treating with a mineral acid the separated solid to dissolve the precipitated uranium salt from the added filter aid, separating the solution thus produced and adjusting its pH to a value of at least about 1.0 whereby a precipitate containing uranium is obtained.

2. A process as claimed in claim 1 in which the rock phosphate is opened up with a reactant comprising a member of the group consisting of sulphuric acid, hydrochloric acid, nitric acid, a mixture of sulphuric acid with nitric acid, and a liquid mixture consisting essentially of sulphuric acid containing ammonium sulphate.

3. A process as claimed in claim 1 in which residual solid present in the reactant mixture after the opening up process, is removed from the liquid.

4. A process as claimed in claim 1 in which the rock phosphate is opened up under oxidising conditions by passing air through the reaction mixture.

5. A process as claimed in claim 1 in which neutralisation is obtained by using a reagent selected from the group consisting of gaseous ammonia, the hydroxides and carbonates of ammonia, the alkali metals, the alkaline earth metals.

6. A process as claimed in claim 1 in which the inorganic filter aid comprises a member of the group consisting of silica, fuller's earth, and diatomaceous earth.

7. A process as claimed in claim 1 in which the quantity of inorganic filter aid is between 0.5 gm. and 1.0 gm. per litre of liquid to be treated.

8. A process as claimed in claim 1 in which the uranium values are precipitated in the reaction mixture containing the inorganic filter aid by the addition of sodium hydrosulphite.

9. A process as claimed in claim 8 in which the proportion of sodium hydrosulphite is from 0.5 to 1.0 gm. per litre of reactant mixture to be treated.

10. A process as claimed in claim 1 in which the precipitation of the uranium values from the reactant mixture containing the inorganic filter aid, is carried out at a temperature in the neighbourhood of 50° C.

11. A process as claimed in claim 1 in which the reactant mixture containing the inorganic filter aid and the precipitated uranium values is allowed to settle to give a thickened slurry, and a portion of the thickened slurry is thereafter returned to an earlier stage in the process.

12. A process as claimed in claim 1 in which the mineral acid for treating the separate inorganic filter aid containing the uranium salt, is nitric acid.

13. A process as claimed in claim 1 in which the pH value of the liquid is adjusted by the addition of ammonia to a value of about 1.0.

14. A process for the recovery of uranium values from rock phosphate which comprises the steps of opening up a rock phosphate under oxidizing conditions with a reactant selected from the group conisting of sulphuric acid, hydrochloric acid, nitric acid, a mixture of sulphuric acid with nitric acid and a liquid mixture consisting essentially of sulphuric acid containing ammonium sulphate; neutralizing the resulting reaction mixture with a neutralizing agent selected from the group consisting of gaseous ammonia and the hydroxides and carbonates of ammonia, the alkali metals and the alkaline earth metals, to obtain a liquid having a pH value in the range of 3.5 to 5.0; precipitating from the liquid thus obtained a uranium salt at a temperature in the neighborhood of 50° C. and in the presence of an added inorganic filter aid selected from the group consisting of, silica, fuller's earth and diatomaceous earth, using from 0.5 gm. to 1.0 gm. of filter aid per litre of liquid being treated and from 0.5 to 1.0 gm. sodium hydrosulphite as the precipitant per litre of liquid; separating the solid mixture from the liquid, treating the separated solid with nitric acid under oxidizing conditions to dissolve the precipitated uranium salt from the filter aid; separating the solution thus produced and treating the same with hydrogen peroxide to precipitate hydrated uranium tetroxide.

15. A process for the recovery of uranium values from rock phosphate which comprises the steps of opening up a rock phosphate under oxidizing conditions with a reactant selected from the group consisting of sulphuric acid, hydrochloric acid, nitric acid, a mixture of sulphuric acid with nitric acid and a liquid mixture consisting essentially of sulphuric acid containing ammonium sulphate; neutralizing the resulting reaction mixture with a neutralizing agent selected from the group consisting of gaseous ammonia and the hydroxides and carbonates of ammonia, the alkali metals and the alkaline earth metals, to obtain a liquid having a pH value in the range of 3.5 to 5.0; precipitating from the liquid thus obtained a uranium salt at a temperature in the neighborhood of 50° C. and in the presence of an added inorganic filter aid selected from the group consisting of, silica, fuller's earth and diatomaceous earth, using from 0.5 gm. to 1.0 gm. of filter aid per litre of liquid being treated and from 0.5 to 1.0 gm. sodium hydrosulphite as the precipitant per litre of liquid, separating the solid mixture from the liquid, treating the separated solid with nitric acid under oxidizing conditions to dissolve the precipitated uranium salt from the filter aid; separating the solution thus produced and adjusting the pH of the separated solution to a value of about 1.0 by the addition of ammonia thereto whereby a precipitate containing uranium is obtained.

16. A process for the recovery of uranium values from rock phosphate which comprises the steps of opening up rock phosphate with a reactant consisting essentially of a mineral acid, neutralizing the resulting reaction mixture to a pH value in the range of 3.5 to 5.0, separating undissolved materials, and precipitating from the liquid obtained therefrom, a phosphate-containing uranium salt in the presence of an added inorganic filter aid using as precipitant a reducing agent, separating the solid mixture from the liquid, treating with a mineral acid the separated solid to dissolve the precipitated uranium salt from the added filter aid, separating the solution thus produced, and treating the same with hydrogen peroxide to precipitate hydrated uranium tetroxide.

References Cited in the file of this patent

UNITED STATES PATENTS

| 880,645 | Fleck et al. | Mar. 3, 1908 |
| 2,743,156 | Metziger et al. | Apr. 24, 1956 |
| 2,787,587 | Woodard | Apr. 2, 1957 |

OTHER REFERENCES

Engineering and Mining Journal, vol. 155, No. 10, page 122 (October 1954).